United States Patent [19]  [11] 3,876,573
Engelhardt et al.  [45] Apr. 8, 1975

[54] POLYACRYLAMIDE PARTICLES COATED WITH A POWDER

[75] Inventors: Friedrich Engelhardt; Günter Gruber, both of Frankfurt; Joachim Ribka, Offenbach, Main-Burgel, all of Germany

[73] Assignee: Cassella Farbwerke Mainkur Aktiengesellschaft, Frankfurt(Main), Germany

[22] Filed: Sept. 13, 1973

[21] Appl. No.: 397,104

Related U.S. Application Data

[63] Continuation-in-part of Ser. No. 276,667, July 31, 1972, abandoned.

[30] Foreign Application Priority Data
Aug. 31, 1971  Germany............................ 2143549
Aug. 27, 1973  Germany............................ 2343179

[52] U.S. Cl.......... 260/17.4 ST; 117/100 C; 210/54; 260/17.4 R; 260/17.5; 260/29.6 Z; 260/42.13; 260/80.3 N; 260/89.7 S
[51] Int. Cl............................................. C08d 9/06

[58] Field of Search........ 260/17.4 ST, 17.4 R, 17.5, 260/41 A, 29.6 S, 89.7 S, 80.3 N; 117/100 C; 210/54

[56] References Cited
UNITED STATES PATENTS
3,147,218  9/1964  Booth et al. ........................... 210/54
3,511,791  5/1970  Puetzer et al. ...................... 260/17.4
3,714,136  1/1973  Gershberg ...................... 260/89.7 S
3,766,120  10/1973  Gershberg...................... 260/29.6 Z

*Primary Examiner*—Morris Liebman
*Assistant Examiner*—Edward Woodberry
*Attorney, Agent, or Firm*—Connolly and Hutz

[57] ABSTRACT

Particulated, non-flowable, water-soluble, water-containing polyacrylamide polymers having a molecular weight of from 2 to 12 million coated with a powder which is insoluble or hardly soluble in water and capable of binding water and thus prevents agglomeration or melting together of the particles and the utility thereof in the flocculation and/or sedimentation of solids from water.

5 Claims, No Drawings

POLYACRYLAMIDE PARTICLES COATED WITH A POWDER

This is a continuation-in-part of application Ser. No. 276,667 filed July 31, 1972 and now abandoned.

The present invention relates to a storage-stable polyacrylamide polymer gel useful in the flocculation and/or sedimentation of solids from water.

Homopolymers and copolymers of acrylamide with molecular weights above 2 million are particularly useful as flocculating and sedimentation agents and are commercially available for that purpose in a solid powder form. Aqueous solutions of such polymers are of high viscosity event at small concentrations of 2 to 5% by weight. Solutions of concentrations of less than 2% by weight partially lose their effectiveness during storage (J. Appl. Pol. Sci. 13, 1023 (1969)) and lead to signs of degradation (German DAS No. 1,494,967).

In order to prepare pulverulent homopolymers and copolymers of acrylamide, it is commercially customary to dry or dehydrate, in expensive processes, the highly viscous, polymeric solutions or gels which precipitate during polymerization and to mill this product to a powder. Thus, for example, mechanically disintegrated particles of the high molecular weight polymeric solutions are dehydrated by azeotropic distillation (German DAS No. 1,494,967). According to another known process (British Pat. No. 1,206,711), dehydration of the high molecular weight polymeric solutions is obtained by precipitation from water-miscible organic solvents. Another customary process is drying with the aid of heated rollers or bands under vacuum.

It has also been suggested to eliminate drying or dehydration of the acrylamide polymer and to deliver it in the form of a gelatin, preferable as a non-flowable gelatin, to the consumer who would mechanically disintegrate it as needed and dissolve it in a dilute solution for utilization as a flocculating or sedimentation agent.

The delivery of particulated polyacrylamide polymer gels proved impossible since the particles were not storable, i.e., during storage they agglomerated or fused together and, as a result, repeated mechanical disintegration was required prior to dissolving to form a dilute solution.

The present invention is based on the discovery that homopolymers and copolymers of polyacrylamide gels may be converted into a storage-stable, particulated form. The compositions of this invention comprise particulated, non-flowable, water-soluble, water-containing polyacrylamide polymer gels having a molecular weight of from 2 to 12 million and a particle size of from about 0.2 to 5 mm and a coating for said particles comprising a powder which is insoluble or hardly soluble in water and capable of binding water, said powder being present in an amount of from about 0.5 to 35% by weight based on the weight of said polymer gel particles.

Polyacrylamide polymers in the form on non-flowable, water-soluble, water-containing gels having a molecular weight of from 2 to 12 million, preferably from 3 to 9 million and having a water content up to 80% by weight, are readily prepared in accordance with known procedures. A preferred method for preparing such gels is described in U.S. Pat. No. 3,476,717 and involves the polymerization of acrylamide, in the optional presence of one or more copolymerizable monomers as described hereinafter, in the presence of a redox catalyst system wherein the reducing component is an N-substituted carbamate such as N-p-tolylsulfonylmethyl carbamic acid methyl ester and the oxidizing component is oxygen, an organic peroxide compound or an inorganic peroxide compound. The teaching of U.S. Pat. No. 3,476,717 is incorporated herein by reference and typical illustration of the preparation of a polyacrylamide polymer is set forth hereinafter.

The non-flowable gels employed in the present invention may be particulated to particle sizes of from about 0.2 to 5 mm, preferably from about 0.5 to 2 mm, by various mechanical disintegration means such as extruders, schredders, rasping devices and cutting mechanisms.

Powdering of the particulated gel may be accomplished continuously or discontinuously by mixing in commonly employed mixing devices, such as drum and spiral mixers.

The powder which prevents agglomeration or melting together of the polymer gel particles may be inorganic or organic. Suitable powders are powders which are insoluble or only hardly soluble in water but are capable of binding water. Typical examples of such powders include starches such as corn, potato, rice and wheat starches; dextrin; dextran; flours such as wheat, corn and rye flour; products obtained from starches such as partially etherified or esterified starches; lignin products and the like; silicates; clays; cement, such as portland cement and calcium-aluminate cement; dehydrated gypsum, such as calcium sulphate hemihydrate, plaster of paris, alpha gypsum and soluble anhydrite (drierite) and active silicic acid. Suitable active silicic acid products which are commercially available are typified by Aerosil and Cab-O-Sil. Mixtures of the foregoing powders may also be used effectively. The selected powder is added to the particulated polymeric gel in amounts of 0.5 to 35% by weight, preferably 2 to 10% by weight, said weights being based on the weight of the polymer gel particles.

The powders of the present invention which are insoluble or hardly soluble in water and are capable of binding water and thus prevent agglomeration or melting together of the polymer gel particles may be alkaline, acid or neutral. For particles of an anionic polyacrylamide gel, an anionic, i.e. a basically-reacting, powder substance is used; for particles of a cationic gel, a cationic, i.e., an acid-reacting, powder substance is used in order to prevent changes of the polymer by flocculation processes.

The storage-stable compositions of the present invention may be stored for several months without the particles agglomerating or fusing together. A further increase in storability may be achieved if the particles of the polymeric gel are dried briefly after powdering. The water content is thereby reduced at the surface of the gel particles to an amount less than that toward the centers thereof. A brief drying after powdering is advisable if cement as powder substance is used.

The aforesaid brief drying is expediently accomplished by air current drying. It was particularly unexpected to discover that such drying is possible without the particles agglomerating or fusing together. Furthermore, it was unexpected that the polymer was not damaged by such drying, i.e., unexpectedly the viscosity and the sedimentation-accelerating effect of a solution prepared from the compositions of the present invention is not decreased by such drying.

With dehydrated gypsum as powder substance the powdered products obtained are so hard that they can be ground by milling devices, yielding a storage stable pulverized powdered product.

In addition to storage stability, the advantages of the novel compositions of the present invention include avoiding the difficulties of the prior art powdered product such as dusting and lump formation during the preparation of solutions. In addition the powdered products of the instant invention are superior with respect to effectiveness as flocculating and sedimenting agents as compared with the same polymer obtained by drying and milling. The novel compositions are free flowing granulates or powders, i.e., their particles are capable of trickling.

The following examples illustrate the preparation of the compositions of the present invention, enhanced viscosity of solutions thereof used for flocculation and/or sedimentation treatment, as well as substantial acceleration in the sedimentation effect. The sedimentation acceleration effect was checked on the indicated kaolin suspensions in accordance with the method described in Chemie-Ingenieur-Technik 39, 172–178 (1967).

EXAMPLE 1

A polyacrylamide polymer was prepared by polymerizing an aqueous solution containing 24.73% acrylamide, 0.86% sodium carbonate, 0.024% N-p-tolylsulfonylmethyl carbamic acid methyl ester, 0.048% di-n-butylaminohydrochloride, 0.024% of a copper acetylacetonate solution (1 g. solution corresponds to 12.3 γ Cu) and 0.024 % ammonium peroxy disulfate by polymerizing under a nitrogen atmosphere. Polymerization was initiated by adding the ammonium peroxide sulfate to the aqueous solution at a temperature of about 20°C. After an induction period of approximately 40 minutes, polymerization began with increasing temperature. The temperature rose to about 90°–95°C. After decrease of the temperature to room temperature, the polymer was found to be a non-flowable, water-soluble, water-containing gel.

EXAMPLE 2

The gel of example 1, being a 25 % non-flowable polyacrylamide homopolymer gel (viscosity $\eta$ rel = 1.68 measured at 25°C. in a 0.05 % solution in 1 N sodium nitrate) was particulated to small pieces by the use of a meat mincer having perforated disk bores of 2 mm. The particulated polymer (1 kg) was mixed with 100 g. cornstarch and tumbled in a mixing drum for 10 minutes. There was obtained a flowable, storagestable composition which was readily water-soluble. A 0.1 % aqueous solution of the aforesaid composition was prepared. Upon the addition of 1 ppm polymer in the form of said solution to 500 g. of a kaolin suspension containing 20 g/l solids, a sedimentation speed of 34.8 cm/min was obtained.

The aforesaid polymer gel was worked up into a powder by drying at 80°C. and milled in a pinned disk mill. A viscosity of $\eta$ rel = 1.59 was obtained for a 0.05 % solution in 1 N sodium nitrate at 25°C. In a duplicate sedimentation experiment, a settling speed of 28.5 cm/min was obtained.

EXAMPLE 3

A copolymer gel consisting of 75% by weight water and 25% by weight of a copolymer of acrylamide and acrylic acid in a weight ratio of 85:15 (viscosity $\eta$ rel = 1.85 at 25°C. in a 0.05% solution in 1 N sodium nitrate) was particulated to small pieces with the aid of a meat mincer having perforated disk bores of 2 mm. The disintegrated hydrous polymer was treated continuously in a spiral mixture with a mixture consisting of 8% by weight potato starch and 0.5% by weight Aerosil (an active silicic acid product), said weights being based on the total weight of hydrous polymer. There was obtained a flowable, storable polymer granulate having the same relative viscosity as the polymer ingredient.

A 0.1% aqueous solution was prepared from the granulate of the preceding paragraph. Upon addition of 1 ppm copolymer in the form of said 0.1% solution to 500 g. of a kaolin suspension having a solids content of 20 g./l., a sedimentation speed of 94.3 cm/min was obtained.

If the polymer gel of this example is worked up into a powdered product by drying at 60°C. under vacuum and milling in a pinned disk mill, a viscosity of $\eta$ rel = 1.73 is obtained for a 0.05% solution in 1 N sodium nitrate at 25°C. In a duplicate sedimentation experiment, a settling speed of 81.0 cm/min was obtained.

A copolymer gelatin containing 65% water and 35% of a copolymer of acrylamide and methacrylic acid dimethylaminoethyl ester in a molar ratio of 2:1 may be converted into a flowable and storable polymer granulate by the procedure of the first paragraph of this example employing a mixture of cornstarch and dextrin in a weight ratio of 1:1.

EXAMPLE 4

A copolymer gelatin of 80% water and 20% of a copolymer of acrylamide and acrylic acid in a weight ratio of 95:5 (viscosity $\eta$ rel = 1.66 measured at 25°C. in a 0.05% solution in 1 N sodium nitrate) was particulated to small pieces by the use of a meat mincer having perforated disk bores of 0.8 mm. and 100 kg. of the thusly prepared polymeric particles were treated for 5 minutes in a cement mixer with 8 kg. cornstarch and 2 kg. Amijel. The latter is a product sold by Messrs. Deutsche Maizena Werke GmbH, Hamburg, and is a cationic, etherified starch product similar to that as described in U.S. Pat. No. 2,813,093.

The granulate obtained by the preceding paragraph was conducted on a conveyor belt through an air current of 60°C. for 8 minutes. The thusly prepared flowable, storable, highly water-soluble polymer granulate possessed a solids content of 34%. On dissolving this granulate, no reduction in the original viscosity could be determined. Upon the addition of 1 ppm of this copolymer in the form of 0.1% solution to 500 g. of a kaolin suspension having a solids content of 20 g./l., a sedimentation speed of 49.8 cm/min was measured.

The aforesaid copolymer gel was worked up to a powder product by drying at 60°C. under vacuum and milling in a grinding mill. A viscosity of $\eta$ rel = 1.6 was measured for a 0.05% solution in 1 N sodium nitrate at 25°C. In a duplicate sedimentation experiment, a settling speed of 42.1 cm/min was obtained.

EXAMPLE 5

The gel of example 1, being a 25 % non-flowable polyacrylamide homopolymer gel (viscosity $\eta$ rel = 1.68 measured in a 0.05 % solution in 1 N sodium nitrate) was particulated to small pieces by the use of a meat mincer having perforated disc bores of 2mm. The particulated polymer (1 kg.) was mixed with 180 g. plaster of paris. There was obtained a flowable storable polymer granulate being so hard, that it could be ground in a cross beater mill to a storable, flowable powder.

We claim:

1. A storage stable composition comprising particulated non-flowable, water-soluble, water-containing polyacrylamide polymer gel having a molecular weight of from 2 to 12 million and a particle size of from about 0.2 to 5 mm and a coating for said particles comprising a powder which is selected from the group consisting of corn, potato, rice and wheat starch and wheat, corn and rye flour, said powder being present in an amount of from about 0.5 to 35% by weight based on the weight of said polymer gel particles.

2. The storage-stable composition of claim 1 wherein said molecular weight is from 3 to 9 million.

3. The storage-stable composition of claim 1 wherein said particle size is from about 0.5 to 2 mm.

4. The storage-stable composition of claim 1 wherein said percentage by weight is from about 2 to 10% by weight.

5. The storage-stable composition of claim 1 wherein there is a lower water content at the surfaces of said gel particles than toward the centers thereof.

* * * * *